US012567808B2

(12) United States Patent
Ogata

(10) Patent No.: US 12,567,808 B2
(45) Date of Patent: Mar. 3, 2026

(54) DC-DC CONVERTER, CONTROL METHOD AND CONTROL PROGRAM

(71) Applicant: Renesas Electronics Corporation, Tokyo (JP)

(72) Inventor: Toma Ogata, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 124 days.

(21) Appl. No.: 18/584,008

(22) Filed: Feb. 22, 2024

(65) Prior Publication Data

US 2024/0305196 A1 Sep. 12, 2024

(30) Foreign Application Priority Data

Mar. 9, 2023 (JP) ................................. 2023-036241

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05); *H02M 1/0032* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227;

G05F 3/245; G05F 3/247; G05F 3/262; G05F 3/265; G05F 3/267; G05F 1/575; H02M 5/2573; H02M 1/081;
(Continued)

(56) References Cited

U.S. PATENT DOCUMENTS 8,970,199 B2      3/2015  Scoones et al.
9,356,530 B2 *    5/2016  Tanifuji ............ H02M 3/33592
(Continued)

FOREIGN PATENT DOCUMENTS

DE        102009024159 A1    12/2010

OTHER PUBLICATIONS

Jong-Seok Kim, Jin-O Yoon, and Byong-Deok Choi, "A High-Light-Load-Efficiency Low-Ripple-Voltage PFM Buck Converter for IoT Applications", IEEE Transactions on Power Electronics, vol. 37, No. 5, May 2022, pp. 5763-5772. 10 pages.
(Continued)

*Primary Examiner* — Jeffrey A Gblende
(74) *Attorney, Agent, or Firm* — SCULLY, SCOTT, MURPHY & PRESSER, P.C.

(57) ABSTRACT

A DC-DC converter is disclosed. The DC-DC converter includes a first switching element between an external input terminal and an inductor of a smoothing filter, a second switching element provided between the inductor and a reference voltage terminal, a control circuit for on-off controlling the first and second switching elements according to the upper and lower limit values of the output voltage, and a period determination circuit configured to determine the predetermined period based on the voltage corresponding to the upper limit value of the output voltage.

10 Claims, 9 Drawing Sheets

(58) Field of Classification Search
CPC .......... H02M 5/293; H02M 7/12; H02M 3/10;
H02M 3/125; H02M 3/13; H02M 3/135;
H02M 3/145; H02M 3/15; H02M 3/155;
H02M 3/156; H02M 3/157; H02M 3/158;
H02M 1/346; H02M 3/1588; H02M
2003/1566; H02M 3/1582; H02M 3/1584;
H02M 2003/1557; H02M 1/0032; H02M
1/4225; H02M 7/217; H02M 1/0025;
H02M 1/0045; H02M 1/0009; H02M
1/08; H02M 1/088; H02M 1/0048; H05B
39/048; B23K 11/24; H04B 2215/069
See application file for complete search history.

(56)                    References Cited

U.S. PATENT DOCUMENTS

| | | | |
|---|---|---|---|
| 10,444,778 B2 * | 10/2019 | Vilas Boas | ............ G11C 5/147 |
| 2012/0105031 A1 * | 5/2012 | Kumagai | ............. H02M 3/156 |
| | | | 323/271 |

OTHER PUBLICATIONS

Kim, Jong-Seok; Yoon, Jin-O; Choi, Byong-Deok: "A High-Light-Load-Efficiency Low-Ripple Voltage PFM Buck Converter for IoT Applications". In: IEEE Transactions on Power Electronics, vol. 37, 2022, No. 5, pp. 5763-5772.-ISSN 0885-8993 (P), 1941-0107 (E). DOI: 10.1109/TPEL.2021.3131594. 10 pages.
DE Office Action dated Dec. 22, 2025 issued in DE Appl 102024106599.0.

* cited by examiner

ON-PERIOD DETERMINATION CIRCUIT

164

167

N51

DO

AJ

166

165

DI

VSS

DC-DC CONVERTER, CONTROL METHOD AND CONTROL PROGRAM

CROSS-REFERENCE TO RELATED APPLICATIONS

This application claims priority under 35 U.S.C. § 119 to Japanese Patent Application No. 2023-036241 filed on Mar. 9, 2023. The disclosure of Japanese Patent Application No. 2023-036241, including the specification, drawings and abstract, is incorporated herein by reference in its entirety.

BACKGROUND

The present disclosure relates to a DC-DC converter, a control method thereof, and a control program thereof, for example, a DC-DC converter suitable for improving power efficiency while generating a stable output voltage, a control method thereof, and a control program thereof.

There is disclosed a technique listed below.

[Non-Patent Document 1] Jong-Seok Kim, Jin-O Yoon, and Byong-Deok Choi, "A High-Light-Load-Efficiency Low-Ripple-Voltage PFM Buck Converter for IoT Applications", IEEE TRANSACTIONS ON POWER ELECTRONICS, VOL. 37, NO. 5, May 2022, pp. 5763-5772

Non-Patent Document 1 discloses a DC-DC converter that detects a start of charging of an inductor using a dynamic comparator. Here, the DC-DC converter disclosed in Non-Patent Document 1 reduces power consumption by lowering a frequency of a clock supplied to the dynamic comparator, at the time of low load.

SUMMARY

In recent years, further improvement in power efficiency of a DC-DC converter at time of low load has been required. However, when an attempt is made to reduce the power consumption of the DC-DC converter at the time of low load, a ripple occurs in an output voltage, and it is difficult to generate a stable output voltage. Other problems and novel features will be apparent from the description of this specification and the accompanying drawings.

A DC-DC converter according to this disclosure includes: a smoothing filter including an inductor and a first capacitive element and configured to smooth an output voltage of an external output terminal; a first switching element provided between an external input terminal to which an input voltage is supplied and the inductor; a second switching element provided between the inductor and a reference voltage terminal to which a reference voltage is supplied; a lower limit detection circuit configured to detect that the output voltage decreases to be equal to or lower than a lower limit value; a voltage detection circuit configured to detect a voltage corresponding to an upper limit value of the output voltage; a control circuit configured to supply a current to the external output terminal from the external input terminal via the first switching element and the inductor by performing control to turn on the first switching element and to turn off the second switching element, for a predetermined period, at a timing when the lower limit detection circuit detects that the output voltage decreases to be equal to or lower than the lower limit value, supply a current to the external output terminal from the reference voltage terminal via the second switching element and the inductor, by performing control to turn off the first switching element and to turn on the second switching element, after the predetermined period has elapsed, and perform control to turn off both of the first switching element and the second switching element at a timing when the voltage detection circuit detects the voltage corresponding to the upper limit value of the output voltage; and a period determination circuit configured to determine the predetermined period, based on the voltage corresponding to the upper limit value of the output voltage detected by the voltage detection circuit.

A control method of a DC-DC converter according to this disclosure is a control method of a DC-DC converter including at least a smoothing filter including an inductor and a first capacitive element and configured to smooth an output voltage of an external output terminal, a first switching element provided between an external input terminal to which an input voltage is supplied and the inductor, a second switching element provided between the inductor and a reference voltage terminal to which a reference voltage is supplied, a lower limit detection circuit configured to detect that the output voltage decreases to be equal to or lower than a lower limit value, and a voltage detection circuit configured to detect a voltage corresponding to an upper limit value of the output voltage, and the method includes: supplying a current to the external output terminal from the external input terminal via the first switching element and the inductor, by performing control to turn on the first switching element and to turn off the second switching element, for a predetermined period, at a timing when the lower limit detection circuit detects that the output voltage decreases to be equal to or lower than the lower limit value; supplying a current to the external output terminal from the reference voltage terminal via the second switching element and the inductor, by performing control to turn off the first switching element and to turn on the second switching element, after the predetermined period has elapsed; performing control to turn off both of the first switching element and the second switching element, at a timing when the voltage detection circuit detects the voltage corresponding to the upper limit value of the output voltage; determining the predetermined period, based on the voltage corresponding to the upper limit value of the output voltage detected by the voltage detection circuit; and supplying a current to the external output terminal from the external input terminal via the first switching element and the inductor, by performing control to turn on the first switching element and to turn off the second switching element for a newly determined predetermined period, at a timing when the lower limit detection circuit detects that the output voltage decreases to be equal to or lower than the lower limit value next.

A control program according to this disclosure is a control program for causing a computer to execute control processing of a DC-DC converter including at least a smoothing filter including an inductor and a first capacitive element and configured to smooth an output voltage of an external output terminal, a first switching element provided between an external input terminal to which an input voltage is supplied and the inductor, a second switching element provided between the inductor and a reference voltage terminal to which a reference voltage is supplied, a lower limit detection circuit configured to detect that the output voltage decreases to be equal to or lower than a lower limit value, and a voltage detection circuit configured to detect a voltage corresponding to an upper limit value of the output voltage, and the control program causes the computer to execute processing including: supplying a current to the external output terminal from the external input terminal via the first switching element and the inductor, by performing control to turn on the first switching element and to turn off the second switching element, for a predetermined period, at a timing when the lower limit detection circuit detects that the output voltage decreases to be equal to or lower than the lower limit value; supplying a current to the external output terminal from the reference voltage terminal via the second switching element and the inductor, by performing control to turn off the first switching element and to turn on the second switching element, after the predetermined period has elapsed; performing control to turn off both of the first switching element and the second switching element, at a timing when the voltage detection circuit detects the voltage corresponding to the upper limit value of the output voltage; determining the predetermined period, based on the voltage corresponding to the upper limit value of the output voltage detected by the voltage detection circuit; and supplying a current to the external output terminal from the external input terminal via the first switching element and the inductor, by performing control to turn on the first switching element and to turn off the second switching element for a newly determined predetermined period, at a timing when the lower limit detection circuit detects that the output voltage decreases to be equal to or lower than the lower limit value next.

According to the present disclosure, it is possible to provide a DC-DC converter that is suitable for improving power efficiency while generating a stable output voltage, a control method thereof, and a control program thereof.

BRIEF DESCRIPTION OF THE DRAWINGS

FIG. 5 is a diagram illustrating a first configuration example of an on-period determination circuit provided in the DC-DC converter illustrated in FIG. 1.

FIG. 6 is a diagram illustrating a second configuration example of the voltage comparison circuit provided in the DC-DC converter illustrated in FIG. 1.

FIG. 7 is a diagram illustrating a second configuration example of the on-period determination circuit provided in the DC-DC converter illustrated in FIG. 1.

DETAILED DESCRIPTION

Figure 1:
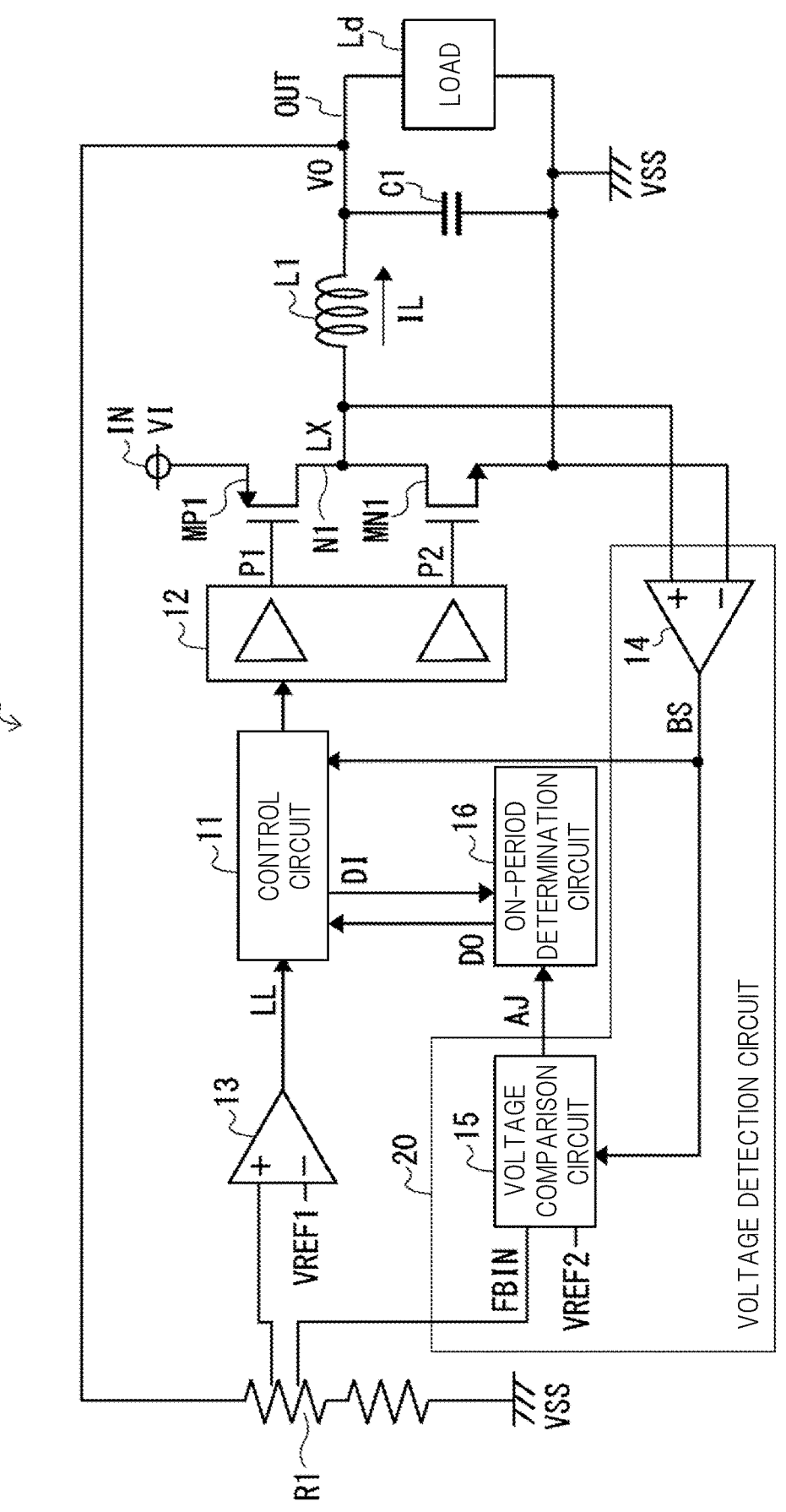
FIG. 1 is a diagram illustrating a configuration example of a DC-DC converter according to a first embodiment.

Hereinafter, embodiments will be described in detail with reference to the drawings. Note that, since the drawings are simplified, the technical scope of the embodiments should not be narrowly interpreted based on the illustrations in the drawings. Note that the same component is denoted with the same reference numeral, and redundant description is omitted.

In the following description, the disclosure will be described in a plurality of sections or embodiments when required as a matter of convenience. However, these sections or embodiments are not irrelevant to each other unless otherwise stated, and the one relates to the entire or a part of the other as a modification, details, or a supplementary explanation thereof. Also, in the embodiments described below, when mentioning the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the number and the like described above (including number of pieces, value, amount, range, and the like).

First Embodiment

FIG. 1 is a diagram illustrating a configuration example of a DC-DC converter 1 according to a first embodiment.

As illustrated in FIG. 1, the DC-DC converter 1 includes a control circuit 11, a drive circuit 12, a lower limit detection circuit 13, a reverse flow detection circuit 14, a voltage comparison circuit 15, an on-period determination circuit 16, a transistor (first switching element) MP1, a transistor (second switching element) MN1, an inductor L1, a capacitive element C1, and a resistance element R1. The reverse flow detection circuit 14 and the voltage comparison circuit 15 form a voltage detection circuit 20. Note that a load Ld is also illustrated in FIG. 1.

The transistor MP1 is a P-channel MOS transistor and switches on/off by a pulse signal P1 output from the drive circuit 12. For example, in the transistor MP1, a source is connected to an input terminal IN to which an input voltage VI is supplied, a drain is connected to one terminal (node N1) of the inductor L1, and the pulse signal P1 is supplied to a gate. The transistor MP1 is turned on in a case where the pulse signal P1 is at an L level and is turned off in a case where the pulse signal P1 is at an H level.

The transistor MN1 is an N-channel MOS transistor and switches on/off by a pulse signal P2 output from the drive circuit 12. For example, in the transistor MN1, a source is connected to a reference voltage terminal (hereinafter, referred to as reference voltage terminal VSS) to which a reference voltage VSS is supplied, a drain is connected to the one terminal (node N1) of the inductor L1, and the pulse signal P2 is supplied to a gate. The transistor MN1 is turned on in a case where the pulse signal P2 is at the H level and is turned off in a case where the pulse signal P2 is at the L level.

The inductor L1 is provided between the node N1 between the transistors MP1 and MN1 and an output terminal OUT. The capacitive element C1 is provided between the output terminal OUT and the reference voltage terminal VSS. The inductor L1 and the capacitive element C1 configure a smoothing filter that smooths an output voltage VO. Hereinafter, a voltage of the output terminal OUT is referred to as the output voltage VO. In the example in FIG. 1, the output voltage VO is supplied to the load Ld.

The control circuit 11 controls switching of on/off of the transistors MP1 and MN1, by a pulse frequency modulation (PFM), using the drive circuit 12. For example, the control circuit 11 adjusts a duty ratio of the pulse signal P1 by changing a period of only one of the H level and the L level (L level in this example) of the pulse signal P1, and accordingly, stabilizes the output voltage VO to a desired level.

The lower limit detection circuit 13 is a so-called comparator and detects that the output voltage VO decreases to be equal to or lower than a lower limit value. For example, the lower limit detection circuit 13 compares a voltage obtained by dividing the output voltage VO by a part of the resistance element R1 (that is, voltage in accordance with output voltage VO) with a reference voltage VREF1 and outputs a detection result LL indicating whether or not the output voltage VO is equal to or lower than the lower limit value. Since a decreasing speed of the output voltage VO is generally slow, a response speed of the lower limit detection circuit 13 does not need to be high. Therefore, the lower limit detection circuit 13 can be configured to reduce power consumption in exchange for reduction in the response speed.

For example, when the output voltage VO decreases to be equal to or lower than the lower limit value, the lower limit detection circuit 13 switches the detection result LL from the H level to the L level. Furthermore, when the output voltage VO increases and becomes higher than the lower limit value, the lower limit detection circuit 13 switches the detection result LL from the L level to the H level.

Here, when the lower limit detection circuit 13 detects that the output voltage VO decreases to be equal to or lower than the lower limit value, the control circuit 11 starts to charge the inductor L1, by performing control to turn on the transistor MP1 and performing control to turn off the transistor MN1, using the drive circuit 12. At this time, since a current flows from the input terminal IN to the output terminal OUT via the transistor MP1 and the inductor L1, the output voltage VO gradually increases. Thereafter, a set period TO has elapsed, the control circuit 11 stops the charging of the inductor L1, by switching the transistor MP1 from on to off using the drive circuit 12. At this time, since a current flows from the reference voltage terminal VSS to the output terminal OUT via the transistor MN1 and the inductor L1 due to a back electromotive force of the inductor L1, the output voltage VO continuously increases.

The voltage detection circuit 20 detects a voltage corresponding to an upper limit value of the output voltage VO. In the voltage detection circuit 20, the reverse flow detection circuit 14 is an upper limit detection circuit that detects that the output voltage VO has reached the voltage corresponding to the upper limit value. Furthermore, in the voltage detection circuit 20, the voltage comparison circuit 15 is an upper limit value detection circuit that detects the voltage corresponding to the upper limit value of the output voltage VO. Hereinafter, the reverse flow detection circuit 14 and the voltage comparison circuit 15 are described.

The reverse flow detection circuit 14 is a so-called comparator and detects that a current IL flowing from the transistor MN1 toward the load Ld via the inductor L1 in a forward direction starts to flow in a reverse direction from the load Ld toward the transistor MN1 via the inductor L1. For example, the reverse flow detection circuit 14 compares a voltage LX of the node N1 between the transistors MP1 and MN1 (drain voltage of transistor MN1) with a source voltage of the transistor MN1 and switches a detection result BS from the L level to the H level in a case where the drain voltage of the transistor MN1 becomes equal to or more than the source voltage.

Here, in a case where the reverse flow of the current IL flowing in the inductor L1 is detected by the reverse flow detection circuit 14, the control circuit 11 prevents the reverse flow of the current IL flowing in the inductor L1, by performing control to turn off both of the transistors MP1 and MN1, using the drive circuit 12. At this time, since a flow of the current from the inductor L1 to the output terminal OUT stops, the output voltage VO gradually decreases. Note that, when the reverse flow of the current IL flowing in the inductor L1 is stopped by turning off the transistors MP1 and MN1, the reverse flow detection circuit 14 switches the detection result BS from the H level to the L level. By repeatedly switching on/off of the transistors MP1 and MN1 as described above by the control circuit 11, the output voltage VO is stabilized at a desired level.

The voltage comparison circuit 15 compares a feedback voltage FBIN of the output voltage VO with a reference voltage VREF2, at a timing when the reverse flow of the current IL flowing in the inductor L1 is detected by the reverse flow detection circuit 14 (that is, timing when detection result BS of reverse flow detection circuit 14 is switched from L level to H level) and outputs a comparison result AJ. Note that the feedback voltage FBIN is a voltage obtained by dividing the output voltage VO by a part of the resistance element R1.

The on-period determination circuit 16 determines the set period TO set by the control circuit 11. The set period TO is an on period of the transistor MP1. In other words, the set period TO is a period (pulse width) of the L level of the pulse signal P1.

For example, the on-period determination circuit 16 receives rise of a signal DI output from the control circuit 11, at the timing when the reverse flow of the current IL flowing in the inductor L1 is detected by the reverse flow detection circuit 14. Then, the on-period determination circuit 16 adds a delay of a delay amount in accordance with the comparison result AJ of the voltage comparison circuit 15 to the signal DI and outputs the signal DI as a signal DO to the control circuit 11. That is, the on-period determination circuit 16 determines a period from rise of the signal DI to rise of the signal DO as the set period TO.

For example, in a case where the feedback voltage FBIN (voltage corresponding to output voltage VO) is equal to or more than the reference voltage VREF2, this means that the output voltage VO is higher than an expected value. Therefore, the on-period determination circuit 16 reduces the delay amount to be added to the signal DI. That is, the on-period determination circuit 16 shortens the set period TO by one step. On the other hand, in a case where the feedback voltage FBIN (voltage corresponding to output voltage VO) is less than the reference voltage VREF2, this means that the output voltage VO is lower than the expected value. Therefore, the on-period determination circuit 16 increases the delay amount to be added to the signal DI. That is, the on-period determination circuit 16 increases the set period TO by one step. Then, when turning on the transistor MP1 next, the control circuit 11 turns on the transistor MP1 for only a length of the set period TO determined by the on-period determination circuit 16.

In this way, the DC-DC converter 1 according to the present embodiment performs sampling of the output voltage VO (upper limit value of output voltage VO) at the timing when the reverse flow of the current IL flowing in the inductor L1 is detected and determines a charging period of the inductor L1 (on period of transistor MP1) in a next cycle on the basis of the sampled output voltage VO. Here, since the DC-DC converter 1 according to the present embodiment detects the upper limit value of the output voltage VO only at the timing when the reverse flow of the current IL flowing in the inductor L1 is detected, without using a high-speed clock signal, it is possible to reduce power consumption. Furthermore, since the DC-DC converter 1 according to the present embodiment can adjust the charging period of the inductor L1 so as not to be longer than necessary, as compared with a case where the charging period of the inductor L1 is fixed, it is possible to prevent a ripple generated in the output voltage. Moreover, since the DC-DC converter 1 according to the present embodiment performs feedback control for determining the charging period of the inductor L1 in the next cycle on the basis of the sampled output voltage VO, it is possible to secure sufficient time required for the feedback control. That is, the DC-DC converter 1 according to the present embodiment can improve power efficiency at the time of low load while generating a stable output voltage.

(Operation of DC-DC Converter 1)

Figure 2:
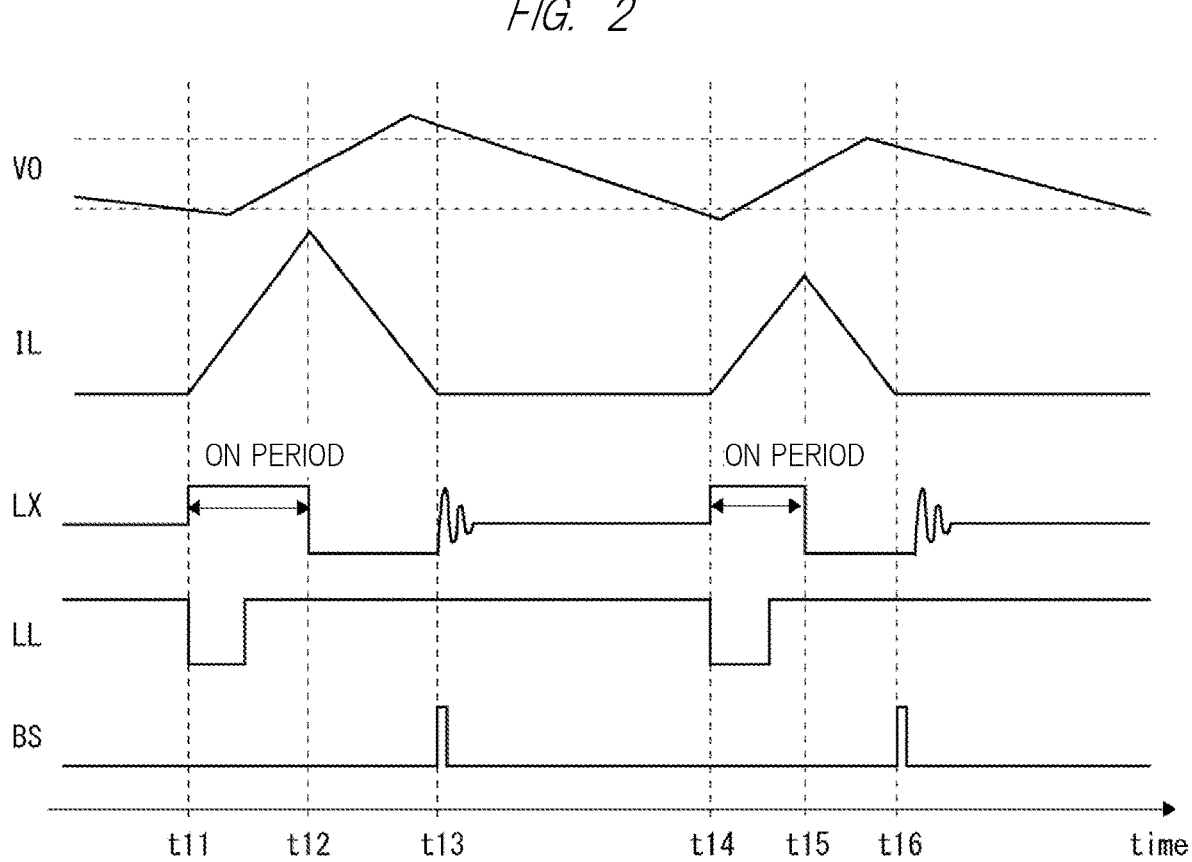
FIG. 2 is a timing chart illustrating an operation of the DC-DC converter illustrated in FIG. 1.

Subsequently, an operation of the DC-DC converter 1 will be described with reference to FIG. 2, in addition to FIG. 1.

In the DC-DC converter 1, when the output voltage VO decreases to be equal to or lower than the lower limit value, the lower limit detection circuit 13 switches the detection result LL from the H level to the L level (time t11). When the lower limit detection circuit 13 detects that the output voltage VO decreases to be equal to or lower than the lower limit value, the control circuit 11 starts to charge the inductor L1, by performing control to turn on the transistor MP1 and performing control to turn off the transistor MN1, using the drive circuit 12 (time t11). At this time, since a current flows from the input terminal IN to the output terminal OUT via the transistor MP1 and the inductor L1, the output voltage VO gradually increases (times t11 and t12).

Thereafter, when the set period TO has elapsed, the control circuit 11 stops the charging of the inductor L1, by switching the transistor MP1 from on to off using the drive circuit 12 (time t12). At this time, the current flows from the reference voltage terminal VSS to the output terminal OUT via the transistor MN1 and the inductor L1 due to the back electromotive force of the inductor L1. As a result, the output voltage VO continuously increases (times t12 and t13).

Thereafter, in a case where the reverse flow of the current IL flowing in the inductor L1 is detected by the reverse flow detection circuit 14, the control circuit 11 prevents the reverse flow of the current IL flowing in the inductor L1, by performing control to turn off both of the transistors MP1 and MN1, using the drive circuit 12 (time t13). At this time, since the flow of the current from the inductor L1 to the output terminal OUT stops, the output voltage VO gradually decreases (times t13 and t14).

By repeating on/off control of the transistors MP1 and MN1 at the times t11 to t14, the DC-DC converter 1 stabilizes the output voltage VO to the desired level (times t11 to t14). Note that the output voltage VO is smoothed by the capacitive element C1.

Here, in the DC-DC converter 1, the voltage comparison circuit 15 compares the feedback voltage FBIN of the output voltage VO with the reference voltage VREF2, at the timing when the reverse flow of the current IL flowing in the inductor L1 is detected by the reverse flow detection circuit 14, and outputs the comparison result AJ (time t13).

Furthermore, the on-period determination circuit 16 receives the rise of the signal DI output from the control circuit 11, at the timing when the reverse flow of the current IL flowing in the inductor L1 is detected by the reverse flow detection circuit 14. Then, the on-period determination circuit 16 adds a delay of a delay amount in accordance with the comparison result AJ of the voltage comparison circuit 15 to the signal DI and outputs the signal DI as a signal DO to the control circuit 11. That is, the on-period determination circuit 16 determines a period from rise of the signal DI to rise of the signal DO as the set period TO.

Figure 5:
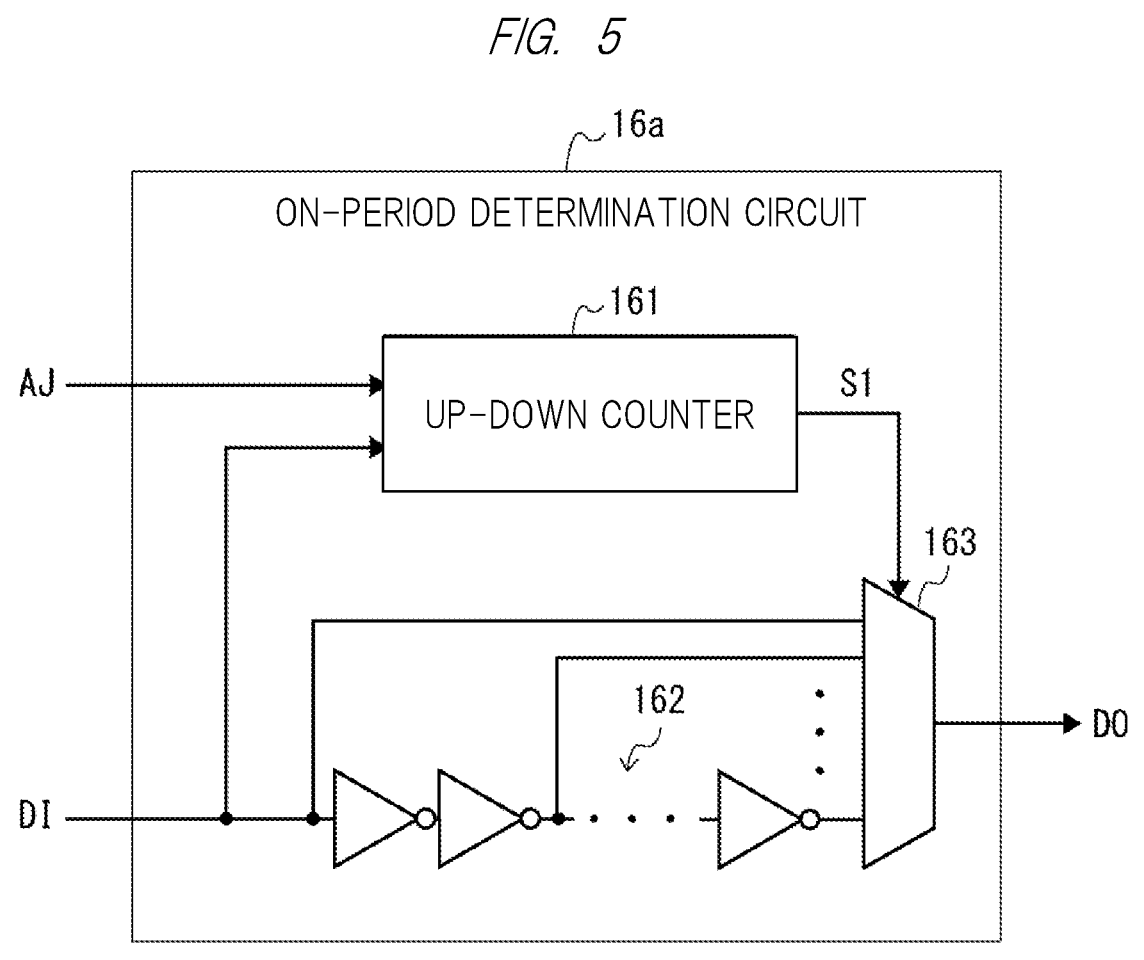

In the example in FIG. 5, since the feedback voltage FBIN (voltage corresponding to output voltage VO) is equal to or higher than the reference voltage VREF2 and the output voltage VO is higher than the expected value, the on-period determination circuit 16 reduces the delay amount to be added to the signal DI. That is, the on-period determination circuit 16 shortens the set period TO by one step. Then, when turning on the transistor MP1 next, the control circuit 11 turns on the transistor MP1 for only the length of the set period TO determined by the on-period determination circuit 16 (times t14 and t15).

In this way, the DC-DC converter 1 according to the present embodiment performs sampling of the output voltage VO (upper limit value of output voltage VO) at the timing when the reverse flow of the current IL flowing in the inductor L1 is detected and determines the charging period of the inductor L1 (on period of transistor MP1) in the next cycle on the basis of the sampled output voltage VO. Here, since the DC-DC converter 1 according to the present embodiment detects the upper limit value of the output voltage VO only at the timing when the reverse flow of the current IL flowing in the inductor L1 is detected, without using a high-speed clock signal, it is possible to reduce power consumption. Furthermore, since the DC-DC converter 1 according to the present embodiment can adjust the charging period of the inductor L1 so as not to be longer than necessary, as compared with a case where the charging period of the inductor L1 is fixed, it is possible to prevent a ripple generated in the output voltage. Moreover, since the DC-DC converter 1 according to the present embodiment performs feedback control for determining the charging period of the inductor L1 in the next cycle on the basis of the sampled output voltage VO, it is possible to secure sufficient time required for the feedback control. That is, the DC-DC converter 1 according to the present embodiment can improve power efficiency at the time of low load while generating a stable output voltage.

Furthermore, since the DC-DC converter 1 according to the present embodiment can improve the power efficiency at the time of the low load, the DC-DC converter 1 can be used instead of a low dropout (LDO) at the time of the low load such as a standby mode. As a result, a device in which the DC-DC converter 1 is mounted can reduce a circuit size and shorten a mode transition time.

Figure 8:
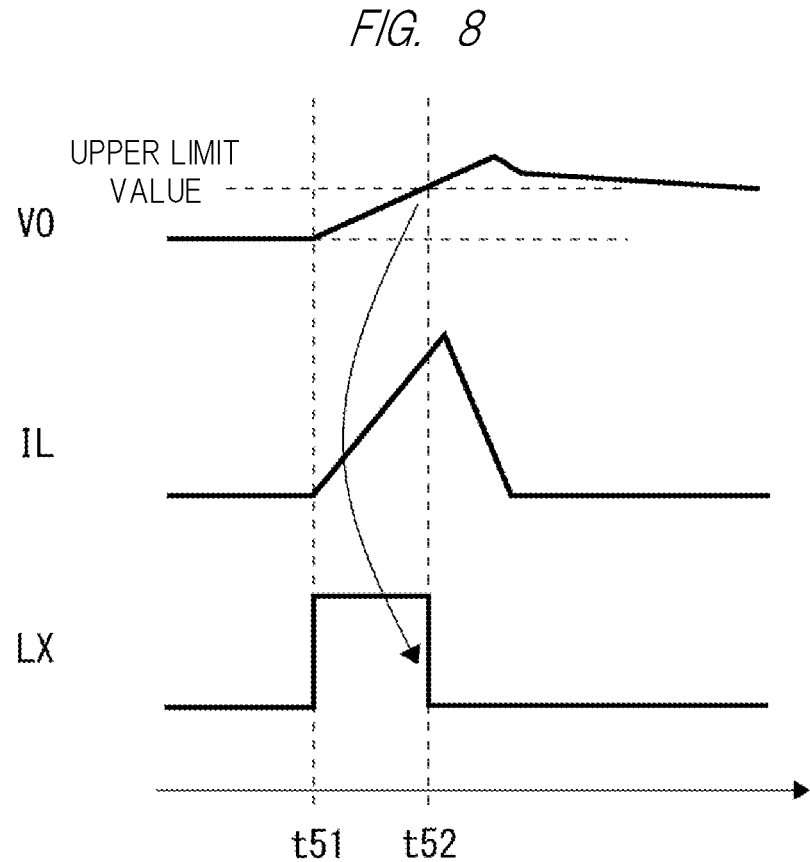
FIG. 8 is a diagram for describing a problem.
Figure 9:
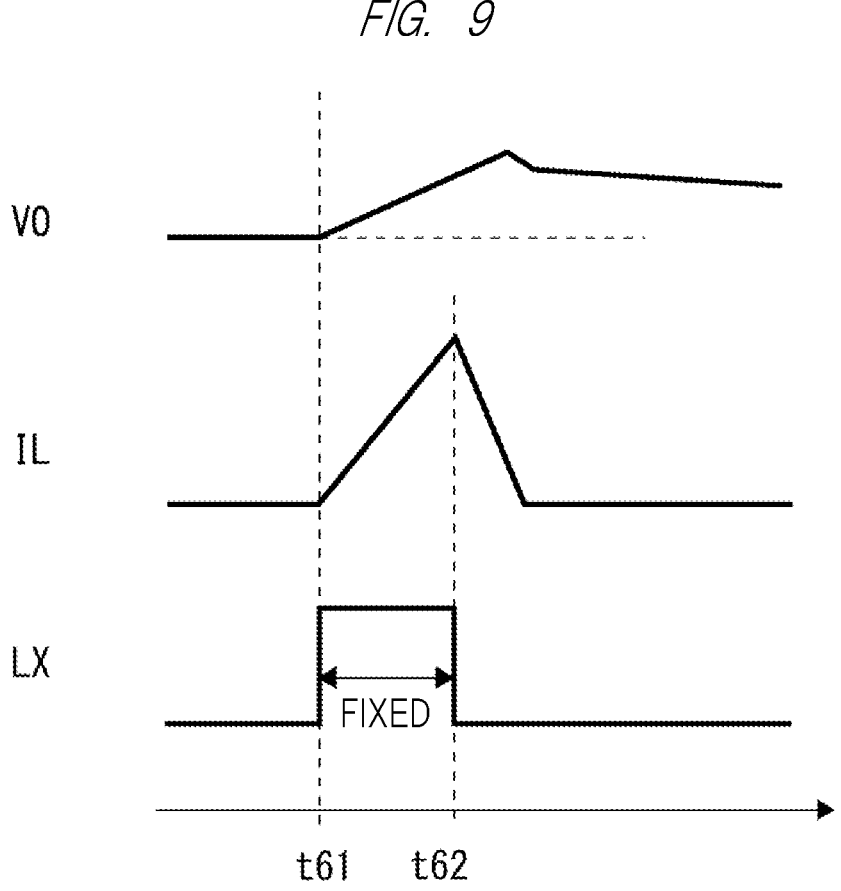
FIG. 9 is a diagram for describing a problem.

Comparison Between DC-DC Converter 1 According to Present Embodiment and Related Art For example, since first related art having a configuration in which the transistor MP1 is switched from on to off at the timing when the upper limit value of the output voltage VO is detected needs a high-speed response, it is difficult to reduce power consumption (refer to FIG. 8). Furthermore, with second related art having a configuration in which the on period of the transistor MP1 is fixed, although the power consumption can be reduced by setting the on period to be long, a ripple occurs in the output voltage (refer to FIG. 9). On the other hand, as described above, unlike the first and second related art, the DC-DC converter 1 according to the present embodiment can improve the power efficiency while generating the stable output voltage.

Figure 3:
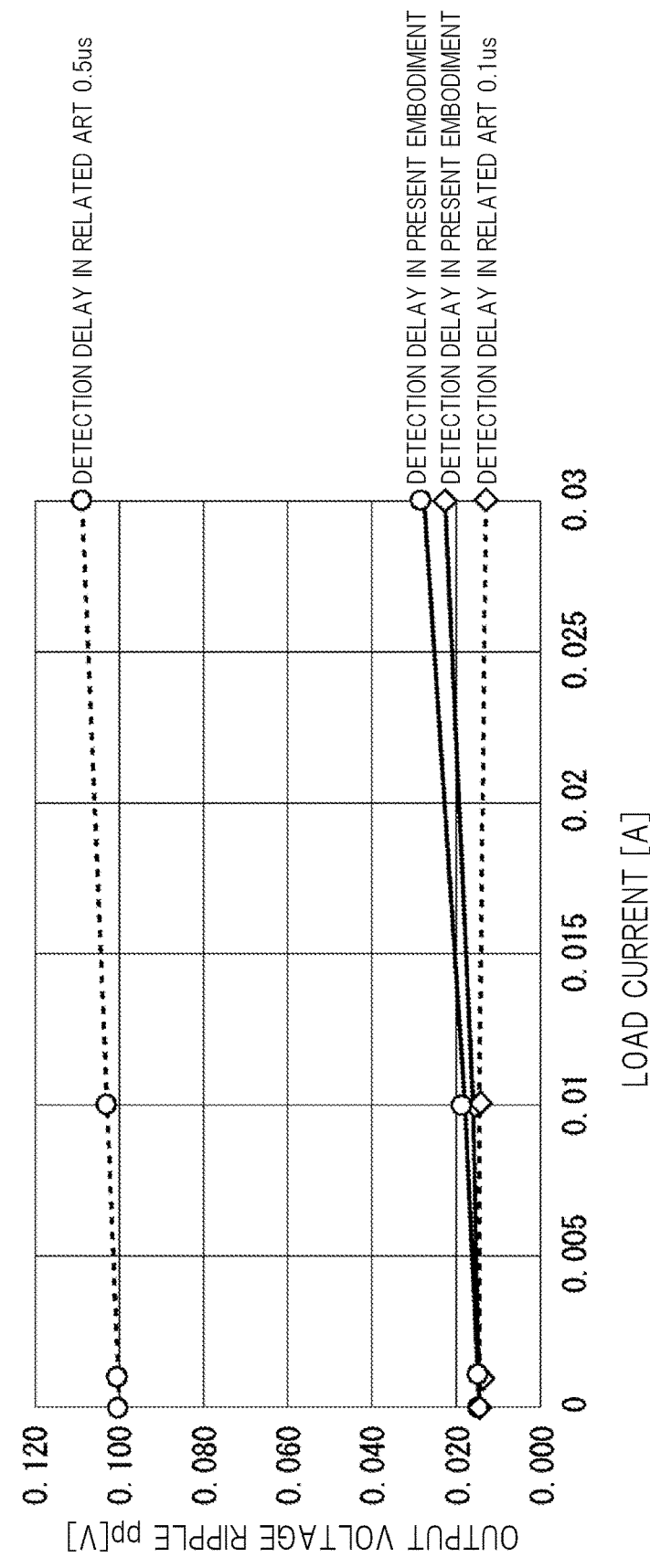
FIG. 3 is a diagram illustrating a relationship between a current to be supplied to a load and a ripple of an output voltage.

FIG. 3 is a diagram illustrating a relationship between a current to be supplied to the load Ld and the ripple of the output voltage VO. In the example in FIG. 3, a solid line indicates an experimental result of the DC-DC converter 1 according to the present embodiment, and a broken line indicates an experimental result of a DC-DC converter according to the first related art. As illustrated in FIG. 3, the DC-DC converter 1 according to the present embodiment prevents the ripple generated in the output voltage VO, regardless of a response performance (that is, even in a case where response performance is low).

Second Embodiment

Figure 4:
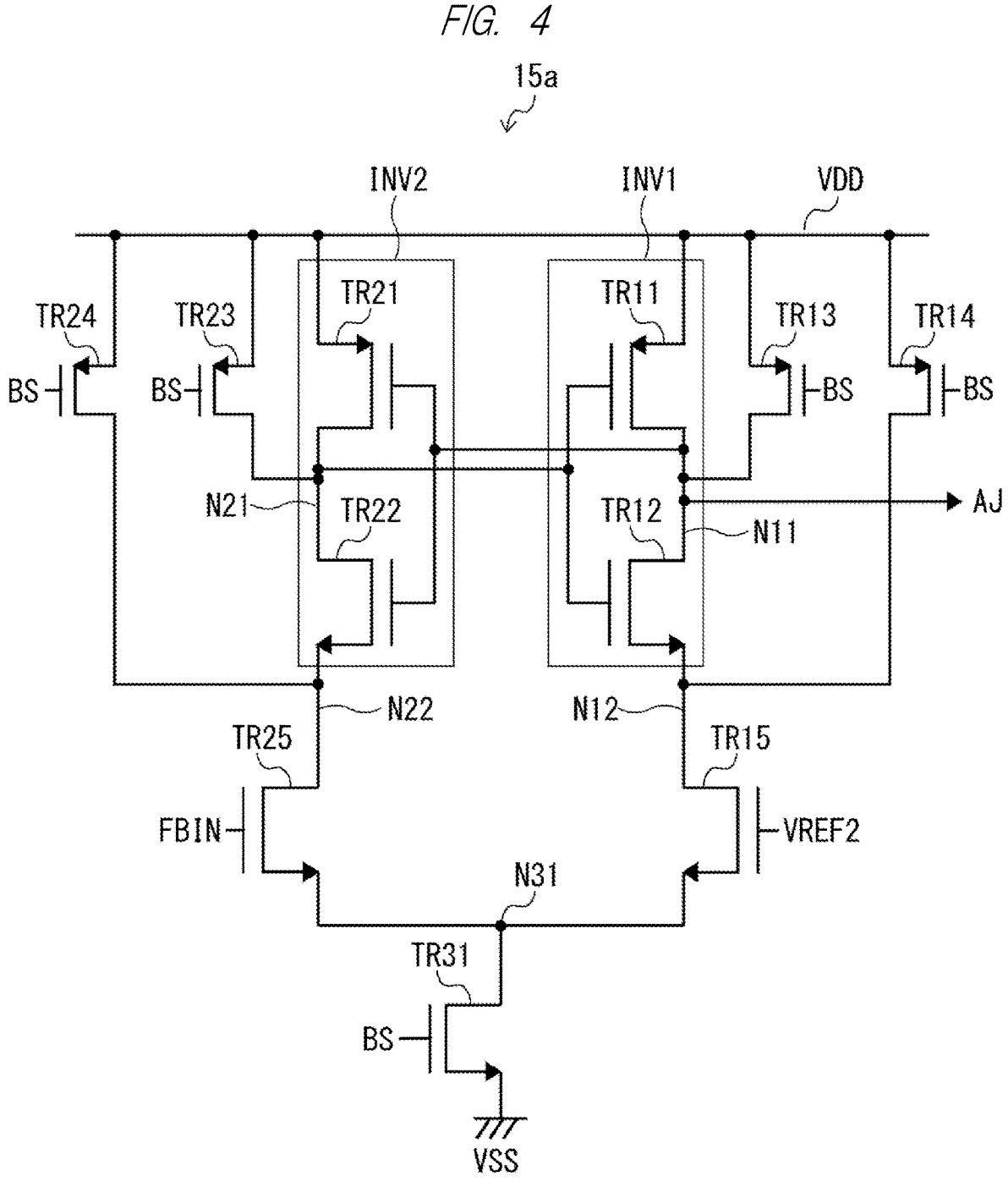
FIG. 4 is a diagram illustrating a first configuration example of a voltage comparison circuit provided in the DC-DC converter illustrated in FIG. 1.

In the present embodiment, a first configuration example of each of a voltage comparison circuit 15 and an on-period determination circuit 16 provided in a DC-DC converter 1 will be described. FIG. 4 is a diagram illustrating the first configuration example of the voltage comparison circuit 15 as a voltage comparison circuit 15a. FIG. 5 is a diagram illustrating the first configuration example of the on-period determination circuit 16 as an on-period determination circuit 16a.

First, the voltage comparison circuit 15a will be described with reference to FIG. 4. As illustrated in FIG. 4, the voltage comparison circuit 15a is a so-called dynamic comparator and includes transistors TR11 to TR15, TR21 to TR25, and TR31. In the present embodiment, a case is described where each of the transistors TR11, TR13, TR14, TR21, TR23, and TR24 is a P-channel MOS transistor and each of the transistors TR12, TR15, TR22, TR25, and TR31 is an N-channel MOS transistor, as an example.

In the transistor TR11, a source is connected to a power supply voltage terminal (hereinafter, referred to as power supply voltage terminal VDD) to which a power supply voltage VDD is supplied, a drain is connected to a node N11, and a gate is connected to a node N21. In the transistor TR12, a source is connected to a node N12, a drain is connected to the node N11, and a gate is connected to the node N21. In the transistor TR21, a source is connected to the power supply voltage terminal VDD, a drain is connected to the node N21, and a gate is connected to the node N11. In the transistor TR22, a source is connected to a node N22, a drain is connected to the node N21, and a gate is connected to the node N11. That is, a first inverter INV1 including the transistors TR11 and TR12 and a second inverter INV2 including the transistors TR21 and TR22 are connected in a loop shape so as to configure a storage circuit.

In the transistor TR15, a source is connected to a node N31, a drain is connected to the node N12, and the reference voltage VREF2 is supplied to a gate. In the transistor TR25, a source is connected to the node N31, a drain is connected to the node N22, and a feedback voltage FBIN (voltage corresponding to output voltage VO) is supplied to a gate.

In the transistor TR13, a source is connected to the power supply voltage terminal VDD, a drain is connected to the node N11, and a detection result BS of a reverse flow detection circuit 14 is supplied to a gate. In the transistor TR14, a source is connected to the power supply voltage terminal VDD, a drain is connected to the node N12, and the detection result BS of the reverse flow detection circuit 14 is supplied to a gate. In the transistor TR23, a source is connected to the power supply voltage terminal VDD, a drain is connected to the node N21, and the detection result BS of the reverse flow detection circuit 14 is supplied to a gate. In the transistor TR24, a source is connected to the power supply voltage terminal VDD, a drain is connected to the node N22, and the detection result BS of the reverse flow detection circuit 14 is supplied to a gate. In the transistor TR31, a source is connected to the reference voltage terminal VSS, a drain is connected to the node N31, and the detection result BS of the reverse flow detection circuit 14 is supplied to a gate.

That is, in a period when a reverse flow of a current IL flowing in an inductor L1 is not detected by the reverse flow detection circuit 14, the transistors TR13, TR14, TR23, and TR24 are turned on, and the transistor TR31 is turned off. Then, at a timing when the reverse flow of the current IL flowing in the inductor L1 is detected by the reverse flow detection circuit 14, the transistors TR13, TR14, TR23, and TR24 are turned off, and the transistor TR31 is turned on. Accordingly, the voltage comparison circuit 15 temporarily performs a comparison operation.

For example, in a case where the feedback voltage FBIN is equal to or higher than the reference voltage VREF2, an on resistance of the transistor TR25 is smaller than an on resistance of the transistor TR15. Therefore, a charge accumulated in the drain (node N22) of the transistor TR25 is extracted earlier than a charge accumulated in the drain (node N12) of the transistor TR15. As a result, since the transistor TR22 is turned on earlier than the transistor TR12, a voltage level of the node N21 (output of second inverter INV2) indicates an L level, and a voltage level of the node N11 (output of first inverter INV1 and comparison result AJ) indicates an H level. That is, in a case where the feedback voltage FBIN is equal to or higher than the reference voltage VREF2, the voltage comparison circuit 15a outputs the comparison result AJ of the H level.

On the other hand, in a case where the feedback voltage FBIN is lower than the reference voltage VREF2, the on resistance of the transistor TR15 is smaller than the on resistance of the transistor TR25. Therefore, the charge accumulated in the drain (node N12) of the transistor TR15 is extracted earlier than the charge accumulated in the drain (node N22) of the transistor TR25. As a result, since the transistor TR12 is turned on earlier than the transistor TR22, the voltage level of the node N11 (output of first inverter INV1 and comparison result AJ) indicates the L level, and the voltage level of the node N21 (output of second inverter INV2) indicates the H level. That is, in a case where the feedback voltage FBIN is lower than the reference voltage VREF2, the voltage comparison circuit 15a outputs the comparison result AJ of the L level.

Subsequently, the on-period determination circuit 16a will be described with reference to FIG. 5. As illustrated in FIG. 5, the on-period determination circuit 16a includes an up-down counter 161, an inverter group 162, and a selector 163.

When receiving rise of a signal DI output from a control circuit 11 at the timing when the reverse flow of the current IL flowing in the inductor L1 is detected by the reverse flow detection circuit 14, the up-down counter 161 counts up or counts down a preset count value (such as, count value set at previous time), in accordance with the comparison result AJ of the voltage comparison circuit 15a.

For example, in a case where the comparison result AJ indicates the H level (that is, in a case where output voltage VO is larger than expected value), the up-down counter 161 counts down the count value by one and outputs the value as a selection signal S1. On the other hand, in a case where the comparison result AJ indicates the L level (that is, in a case where output voltage VO is larger than expected value), the up-down counter 161 counts up the count value by one and outputs the value as the selection signal S1.

The inverter group 162 includes a plurality of inverters connected in series, and delays and outputs the signal DI. The selector 163 selects the output of any one of the plurality of inverters included in the inverter group 162, on the basis of the selection signal S1 and outputs the output as a signal DO. That is, the selector 163 adds a delay of a delay amount in accordance with the selection signal S1 to the signal DI and outputs the signal DI as the signal DO.

For example, in a case where the count value of the up-down counter 161 is counted down, the selector 163 selects a signal with a small delay amount added to the signal DI and outputs the signal as the signal DO. On the other hand, in a case where the count value of the up-down counter 161 is counted up, the selector 163 selects a signal with a large delay amount added to the signal DI and outputs the signal as the signal DO. In other words, in a case where the output voltage VO is larger than the expected value, the selector 163 shortens the set period TO by one step, and in a case where the output voltage VO is smaller than the expected value, the selector 163 increases the set period TO by one step. Then, when a transistor MP1 is turned on next, the control circuit 11 turns on the transistor MP1 only for a length of the set period TO determined by the on-period determination circuit 16a.

Note that both of the voltage comparison circuit 15a and the on-period determination circuit 16a can be appropriately changed to another configuration having equivalent functions.

Third Embodiment

Figure 6:
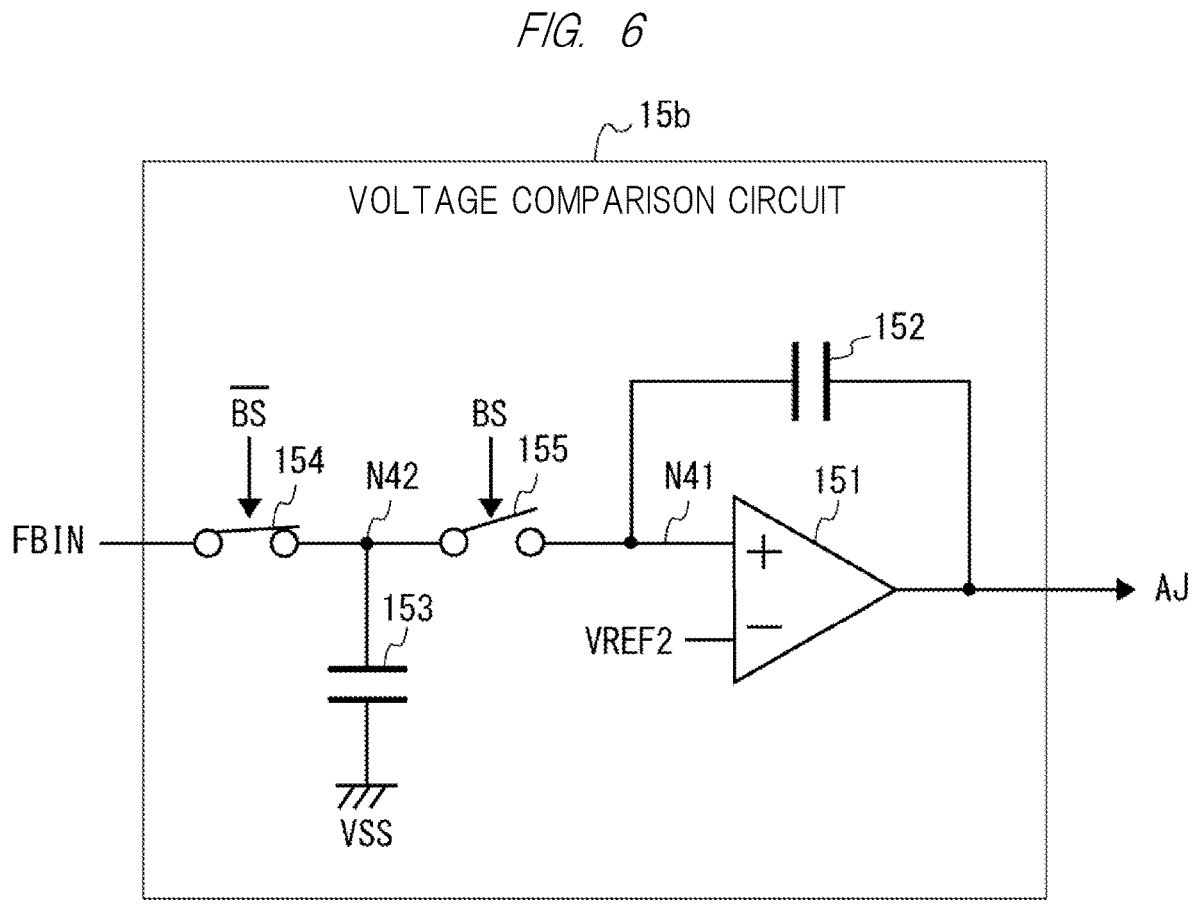
Figure 7:
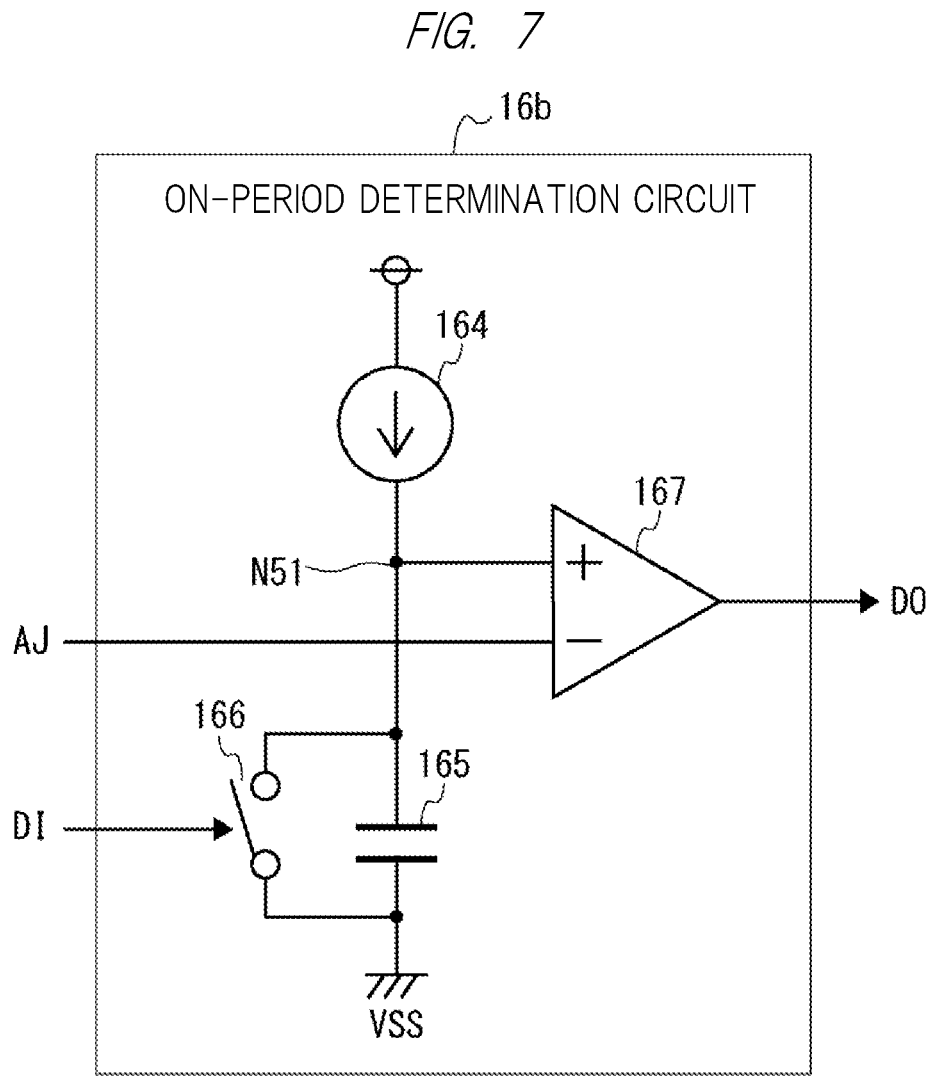

In the present embodiment, a second configuration example of each of a voltage comparison circuit 15 and an on-period determination circuit 16 provided in a DC-DC converter 1 will be described. FIG. 6 is a diagram illustrating the second configuration example of the voltage comparison circuit 15 as a voltage comparison circuit 15b. FIG. 7 is a diagram illustrating the second configuration example of the on-period determination circuit 16 as an on-period determination circuit 16b.

First, the voltage comparison circuit 15b will be described with reference to FIG. 6. As illustrated in FIG. 6, the voltage comparison circuit 15b is a so-called integrator, and includes an operational amplifier 151, a capacitive element 152, a capacitive element 153, a switching element 154, and a switching element 155.

In the operational amplifier 151, a reference voltage VREF2 is supplied to an inverting input terminal, and a voltage of a node N41 is supplied to a non-inverting input terminal. The capacitive element 152 is provided between an output terminal and the non-inverting input terminal of the operational amplifier 151. An output of the operational amplifier 151 is used as a comparison result AJ of the voltage comparison circuit 15b. The switching elements 154 and 155 are provided in series between an input terminal of the voltage comparison circuit 15b to which a feedback voltage FBIN is supplied and the non-inverting input terminal (node N41) of the operational amplifier 151. The capacitive element 153 is provided between a node N42 between the switching elements 154 and 155 and a reference voltage terminal VSS. The switching element 154 switches on/off on the basis of an inversion signal of a detection result BS of a reverse flow detection circuit 14. The switching element 155 switches on/off on the basis of the detection result BS of the reverse flow detection circuit 14.

In a period when a reverse flow of a current IL flowing in an inductor L1 is not detected by the reverse flow detection circuit 14, the switching element 154 is turned on, and the switching element 155 is turned off. Therefore, charges of the feedback voltage FBIN are accumulated in the capacitive element 153. Then, at a timing when the reverse flow of the current IL flowing in the inductor L1 is detected by the reverse flow detection circuit 14, the switching element 154 is turned off, and the switching element 155 is turned on. Then, a voltage (voltage of node N42) in accordance with the charges accumulated in the capacitive element 153 is supplied to the non-inverting input terminal of the operational amplifier 151. Then, the integrator including the operational amplifier 151 and the capacitive element 152 outputs an integration result in accordance with the feedback voltage FBIN and the reference voltage VREF2 as the comparison result AJ. Note that the comparison result AJ is an analog voltage. For example, as the feedback voltage FBIN increases, a potential of the comparison result AJ decreases, and as the feedback voltage FBIN decreases, the potential of the comparison result AJ increases.

Subsequently, the on-period determination circuit 16b will be described with reference to FIG. 7. As illustrated in FIG. 7, the on-period determination circuit 16b includes a constant current source 164, a capacitive element 165, a switching element 166, and a comparator 167.

The constant current source 164 is provided between a power supply voltage terminal VDD and a node N51, and supplies a constant current to the node N51. The capacitive element 165 is provided between the node N51 and the reference voltage terminal VSS. The switching element 166 is provided in parallel to the capacitive element 165 and switches on/off on the basis of a signal DI. The comparator 167 compares a potential of the node N51 with the comparison result AJ of the voltage comparison circuit 15b and outputs a comparison result as a signal DO.

When rise of the signal DI output from a control circuit 11 is received at the timing when the reverse flow of the current IL flowing in the inductor L1 is detected by the reverse flow detection circuit 14, the switching element 166 is switched from on to off. As a result, the potential of the node N51 gradually increases. Then, when the potential of the node N51 increases and reaches the potential of the comparison result AJ, the comparator 167 raises the signal DO. The on-period determination circuit 16 determines a period from the rise of the signal DI to the rise of the signal DO as a set period TO.

For example, as the potential of the comparison result AJ is smaller (that is, as output voltage VO is larger than expected value), the potential of the node N51 increases, and a time before the potential of the node N51 reaches the potential of the comparison result AJ is shortened. Therefore, a rising time of the signal DO is delayed. On the other hand, as the potential of the comparison result AJ is larger (that is, as output voltage VO is smaller than expected value), the potential of the node N51 increases, and the time before the potential of the node N51 reaches the potential of the comparison result AJ increases. Therefore, the rising time of the signal DO becomes earlier. In other words, the reverse flow detection circuit 14 shortens the set period TO as the output voltage VO is larger than the expected value and lengthens the set period TO as the output voltage VO is smaller than the expected value. Then, when a transistor MP1 is turned on next, the control circuit 11 turns on the transistor MP1 only for the length of the set period TO determined by the on-period determination circuit 16b.

Note that both of the voltage comparison circuit 15b and the on-period determination circuit 16b can be appropriately changed to another configuration having equivalent functions.

In this way, the DC-DC converter 1 according to the embodiments performs sampling of the output voltage VO (upper limit value of output voltage VO) at the timing when the reverse flow of the current IL flowing in the inductor L1 is detected and determines a charging period of the inductor L1 (on period of transistor MP1) in a next cycle on the basis of the sampled output voltage VO. Here, since the DC-DC converter 1 according to the embodiments detects the upper limit value of the output voltage VO only at the timing when the reverse flow of the current IL flowing in the inductor L1 is detected, without using a high-speed clock signal, it is possible to reduce power consumption. Furthermore, since the DC-DC converter 1 according to the present embodiment can adjust the charging period of the inductor L1 so as not to be longer than necessary, as compared with a case where the charging period of the inductor L1 is fixed, it is possible to prevent a ripple generated in the output voltage. Moreover, since the DC-DC converter 1 according to the embodiments performs feedback control for determining the charging period of the inductor L1 in the next cycle on the basis of the sampled output voltage VO, it is possible to secure sufficient time required for the feedback control. That is, the DC-DC converter 1 according to the embodiments can improve power efficiency at the time of low load while generating a stable output voltage.

Although the present disclosure made by the inventors has been exemplarily described on the basis of the embodiments above, the present disclosure is not limited to the embodiments described above, and it goes without saying that various modifications can be made without departing from the gist thereof.

Moreover, the present disclosure can implement a part or all of the control processing of the DC-DC converter by causing a CPU to execute a computer program.

The program includes a command group (or software code) for causing the computer to perform one or more functions described in the embodiments in a case where the program is read by the computer. The program may be stored in a non-transitory computer-readable medium or a tangible storage medium. As an example, not limitation, a computer-readable medium or a tangible storage medium includes a random-access memory (RAM), a read-only memory (ROM), a flash memory, a solid-state drive (SSD), or other memory technologies, a CD-ROM, a digital versatile disc (DVD), a Blu-ray (registered trademark) disc, or other optical disc storages, a magnetic cassette, a magnetic tape, a magnetic disc storage, or other magnetic storage devices. The program may be transmitted on a transitory computer-readable medium or a communication medium. As an example, not limitation, the transitory computer-readable medium or the communication media includes an electrical, optical, acoustic, or other forms of propagation signals.

What is claimed is:

1. A DC-DC converter comprising:
a smoothing filter comprising an inductor and a first capacitive element and configured to smooth an output voltage of an external output terminal;
a first switching element provided between an external input terminal to which an input voltage is supplied and the inductor;
a second switching element provided between the inductor and a reference voltage terminal to which a reference voltage is supplied;
a lower limit detection circuit configured to detect that the output voltage decreases to be equal to or lower than a lower limit value;
a voltage detection circuit configured to detect a voltage corresponding to an upper limit value of the output voltage;

a control circuit configured to supply a current to the external output terminal from the external input terminal via the first switching element and the inductor by performing control to turn on the first switching element and to turn off the second switching element, for a predetermined period, at a timing when the lower limit detection circuit detects that the output voltage decreases to be equal to or lower than the lower limit value, supply a current to the external output terminal from the reference voltage terminal via the second switching element and the inductor, by performing control to turn off the first switching element and to turn on the second switching element, after the predetermined period has elapsed, and perform control to turn off both of the first switching element and the second switching element at a timing when the voltage detection circuit detects the voltage corresponding to the upper limit value of the output voltage; and
a period determination circuit configured to determine the predetermined period, based on the voltage corresponding to the upper limit value of the output voltage detected by the voltage detection circuit.

2. The DC-DC converter according to claim 1, wherein the voltage detection circuit comprises:
an upper limit detection circuit configured to detect that the output voltage has reached the voltage corresponding to the upper limit value; and
an upper limit value detection circuit configured to detect the voltage corresponding to the upper limit value of the output voltage, at a timing when the upper limit detection circuit detects that the output voltage has reached the voltage corresponding to the upper limit value.

3. The DC-DC converter according to claim 2, wherein the upper limit detection circuit is a reverse flow detection circuit that detects a reverse flow of a current flowing in the inductor.

4. The DC-DC converter according to claim 3, wherein the reverse flow detection circuit is a first comparator configured to compare a voltage of a node between the first switching element and the second switching element with the reference voltage of the reference voltage terminal and output a comparison result indicating whether or not the current flowing in the inductor is reversed.

5. The DC-DC converter according to claim 2, wherein the upper limit value detection circuit is a dynamic comparator configured to compare a feedback voltage of the output voltage with a reference voltage at the timing when the upper limit detection circuit detects that the output voltage has reached the voltage corresponding to the upper limit value and output a comparison result, and
wherein the period determination circuit determines the predetermined period, based on the comparison result output from the upper limit value detection circuit.

6. The DC-DC converter according to claim 5, wherein the period determination circuit shortens the predetermined period by one step in a case where the comparison result indicating that the feedback voltage is equal to or higher than the reference voltage is output from the upper limit value detection circuit and increases the predetermined period by one step in a case where a comparison result indicating that the feedback voltage is lower than the reference voltage is output from the upper limit value detection circuit.

7. The DC-DC converter according to claim 5,
wherein the period determination circuit comprises:

an up-down counter configured to count up or count down a count value, in accordance with the comparison result output from the upper limit value detection circuit;

an inverter group configured to add delays of a plurality of different delay amounts to a first signal and output the signal; and a selector configured to select the first signal to which the delay of the delay amount in accordance with the count value of the up-down counter is added and output the selected signal as a second signal, and wherein a delay difference between the first signal and the second signal is determined as the predetermined period.

8. The DC-DC converter according to claim 2,
wherein the upper limit value detection circuit comprises an integrator configured to output an integration result in accordance with a feedback voltage of the output voltage and a reference voltage at the timing when the upper limit detection circuit detects that the output voltage has reached the voltage corresponding to the upper limit value, and wherein the period determination circuit comprises:

a constant current source;

a second capacitive element configured to convert a current supplied from the constant current source into a voltage; and a second comparator configured to compare the voltage converted by the second capacitive element with the integration result output from the upper limit value detection circuit and output a comparison result indicating the predetermined period.

9. A control method of a DC-DC converter comprising at least a smoothing filter including an inductor and a first capacitive element and configured to smooth an output voltage of an external output terminal, a first switching element provided between an external input terminal to which an input voltage is supplied and the inductor, a second switching element provided between the inductor and a reference voltage terminal to which a reference voltage is supplied, a lower limit detection circuit configured to detect that the output voltage decreases to be equal to or lower than a lower limit value, and a voltage detection circuit configured to detect a voltage corresponding to an upper limit value of the output voltage, the method comprising:

supplying a current to the external output terminal from the external input terminal via the first switching element and the inductor, by performing control to turn on the first switching element and to turn off the second switching element, for a predetermined period, at a timing when the lower limit detection circuit detects that the output voltage decreases to be equal to or lower than the lower limit value;

supplying a current to the external output terminal from the reference voltage terminal via the second switching element and the inductor, by performing control to turn off the first switching element and to turn on the second switching element, after the predetermined period has elapsed;

performing control to turn off both of the first switching element and the second switching element, at a timing when the voltage detection circuit detects the voltage corresponding to the upper limit value of the output voltage;

determining the predetermined period, based on the voltage corresponding to the upper limit value of the output voltage detected by the voltage detection circuit; and supplying a current to the external output terminal from the external input terminal via the first switching element and the inductor, by performing control to turn on the first switching element and to turn off the second switching element for a newly determined predetermined period, at a timing when the lower limit detection circuit detects that the output voltage decreases to be equal to or lower than the lower limit value next.

10. A non-transitory computer readable storage medium storing a control program for causing a computer to execute control processing of a DC-DC converter comprising at least a smoothing filter comprising an inductor and a first capacitive element and configured to smooth an output voltage of an external output terminal, a first switching element provided between an external input terminal to which an input voltage is supplied and the inductor, a second switching element provided between the inductor and a reference voltage terminal to which a reference voltage is supplied, a lower limit detection circuit configured to detect that the output voltage decreases to be equal to or lower than a lower limit value, and a voltage detection circuit configured to detect a voltage corresponding to an upper limit value of the output voltage, the control program causing the computer to execute processing comprising:

supplying a current to the external output terminal from the external input terminal via the first switching element and the inductor, by performing control to turn on the first switching element and to turn off the second switching element, for a predetermined period, at a timing when the lower limit detection circuit detects that the output voltage decreases to be equal to or lower than the lower limit value;

supplying a current to the external output terminal from the reference voltage terminal via the second switching element and the inductor, by performing control to turn off the first switching element and to turn on the second switching element, after the predetermined period has elapsed;

performing control to turn off both of the first switching element and the second switching element, at a timing when the voltage detection circuit detects the voltage corresponding to the upper limit value of the output voltage;

determining the predetermined period, based on the voltage corresponding to the upper limit value of the output voltage detected by the voltage detection circuit; and supplying a current to the external output terminal from the external input terminal via the first switching element and the inductor, by performing control to turn on the first switching element and to turn off the second switching element for a newly determined predetermined period, at a timing when the lower limit detection circuit detects that the output voltage decreases to be equal to or lower than the lower limit value next.

* * * * *